United States Patent
Deacon

(10) Patent No.: US 6,367,421 B1
(45) Date of Patent: Apr. 9, 2002

(54) COMBINATION PET BRUSH AND GROOMING SOLUTION DISPENSER

(76) Inventor: Robert J. Deacon, 2562 Saxe Rd., Mogadore, OH (US) 44260

(*) Notice: Subject to any disclaimer, the term of this patent is extended or adjusted under 35 U.S.C. 154(b) by 0 days.

(21) Appl. No.: 09/696,418

(22) Filed: Oct. 25, 2000

(51) Int. Cl.[7] ............................................. A01K 13/00
(52) U.S. Cl. ................................................ 119/603
(58) Field of Search .......................... 119/603, 602, 119/604, 605, 606

(56) References Cited

U.S. PATENT DOCUMENTS

| | | | |
|---|---|---|---|
| 2,532,001 A | | 11/1950 | Williams |
| 4,254,738 A | | 3/1981 | Stanley |
| 4,799,456 A | * | 1/1989 | Young ..................... 119/83 |
| 4,913,172 A | * | 4/1990 | Chou ..................... 11/156 |
| D331,840 S | | 12/1992 | Garner |
| D352,397 S | | 11/1994 | Coleman |
| D356,442 S | | 3/1995 | Hayes et al. |
| D357,810 S | | 5/1995 | Evans |
| D375,588 S | | 11/1996 | Bzoch |
| 5,762,433 A | | 6/1998 | Cary |
| 5,823,145 A | * | 10/1998 | Hingiss ..................... 119/603 |
| 5,845,603 A | | 12/1998 | Efaw |
| D417,551 S | | 12/1999 | Pinchuk |
| 6,024,052 A | * | 2/2000 | Efaw ..................... 119/625 |

* cited by examiner

Primary Examiner—Thomas Price
(74) Attorney, Agent, or Firm—John D. Gugliotta; P. Jeff Martin

(57) ABSTRACT

The present invention is a pet or animal brush with means to apply liquid treatments. The brush is made of an inert plastic with the bristles being either metal or synthetic. A reservoir is located within the handle and receives a liquid treatment. A pump distributes the treatment through the handle and out through ports located near the base of the bristles.

15 Claims, 4 Drawing Sheets

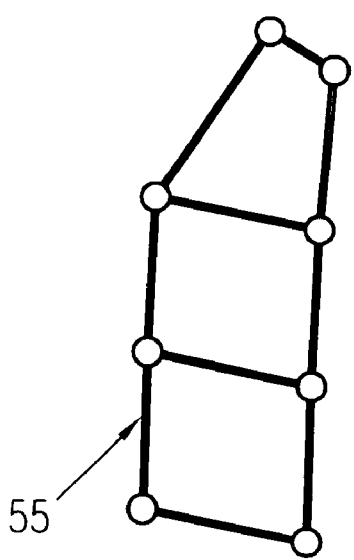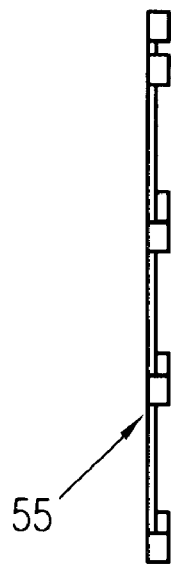
*Figure 6a*  *Figure 6b*

COMBINATION PET BRUSH AND GROOMING SOLUTION DISPENSER

RELATED APPLICATIONS

The present invention was first described in Disclosure Document No. 466,939, filed on Dec. 13, 1999. There are no previously filed, nor currently any co-pending applications, anywhere in the world.

BACKGROUND OF THE INVENTION

1. Field of the Invention

The present invention relates generally to brush type grooming devices and, more particularly, to a combination pet brush and grooming solution dispenser.

2. Description of the Related Art

Keeping pets is a never-ending task, requiring one to constantly feed, groom and clean up after their animal friends. Those that keep animals such as dogs and cats know the importance of a frequent brushing to keep their pet's coat healthy and clean. Often during this brushing, it is required that a liquid pet care product such a conditioner, flea treatment, shampoo or the like be applied. While it is often cumbersome to hold the pet, the brush, and the bottle while removing the cap for the owner, it is often an apprehensive time for the pet who is not sure what is going on or what is going to happen. This combination of problems often leads to an inadequate application at best and a mess for everyone at the worst.

A search of the prior art did not disclose any patents that read directly on the claims of the instant invention; however, the following references were considered related. The following patents disclose a combination brush and flea powder dispenser: U.S. Pat. No. 5,845,603 issued in the name of Efaw, and U.S. Pat. No. 5,762,433 issued in the name of Cary.

The following patents describe the design and function of a pet brush with means to attach a grooming solution:

U.S. Pat. No. 4,254,738 issued in the name of Stanley

U.S. Pat. No. D 375,588 issued in the name of Bzoch

U.S. Pat. No. D 356,442 issued in the name of Hayes et al.

U.S. Pat. No. D 331,840 issued in the name of Gamer describes the ornamental design for a pet brush for attachment to a water hose.

The following patents disclose the design and function of a combined pet brush and container for pesticide: U.S. Pat. No. 2,532,001 issued in the name of Williams; and U.S. Pat. No. D 357,810 issued in the name of Evans.

U.S. Pat. No. D 417,551 issued in the name of Pinchuk describes the ornamental design for a grooming brush for animals.

U.S. Pat. No. D 352,397 issued in the name of Coleman discloses the ornamental design for a medicine-applying paint brush.

Consequently, a need has been felt for providing a means by liquid pet care products can be applied to pets such as cats or dogs while brushing them in a manner which is quick, easy and effective.

SUMMARY OF THE INVENTION

Therefore, it is an object of the invention to provide for an improved pet brush.

It is another object of the present invention to provide for an improved pet grooming solution dispenser.

It is yet another object of the present invention to provide a pet brush that can be used also as a pet grooming solution dispenser.

Briefly described according to one embodiment of the present invention, a pet product applicator brush is provided to aid in the application of liquid pet care products to the fur of pets such as cats and dogs. From outward appearances, the invention strongly resembles a handled brush that is commonly used to brush or clean the coats of pets such as cats and/or dogs. The handle of the invention is large enough to contain a reservoir that contains the actual liquid such as shampoo, conditioner, lotion, etc. The reservoir would accept these liquids in bulk form from a large bottle or by the use of pre-filled cartridges that are simply dropped in. A pump trigger located on the top of the handle then allows the liquid to be pumped from the reservoir through tubes and out distribution ports on the brush head. A cap assembly consisting of multiple caps on a rubber strip is provided to seal the distribution ports when not in use. Additionally, the brush head is interchangeable to allow the use of different brush head with stiff or soft, or long or short bristles.

The use of the present invention allows for the care of pets' coats in a manner that is quick, easy and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 6a is a top plan view of the applicator tip cover of the present invention according to the preferred embodiment; and FIG. 6b is a side view of the applicator tip cover of the present invention according to the preferred embodiment.

DETAILED DESCRIPTION OF THE PREFERRED EMBODIMENT

Figure 1:
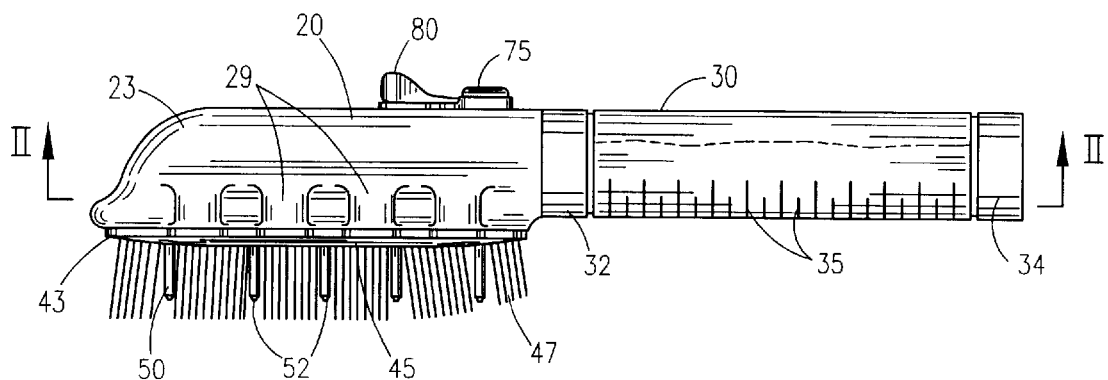
FIG. 1 is a side elevational view of combination pet brush and grooming solution dispenser according to the preferred embodiment of the present invention.
Figure 2:
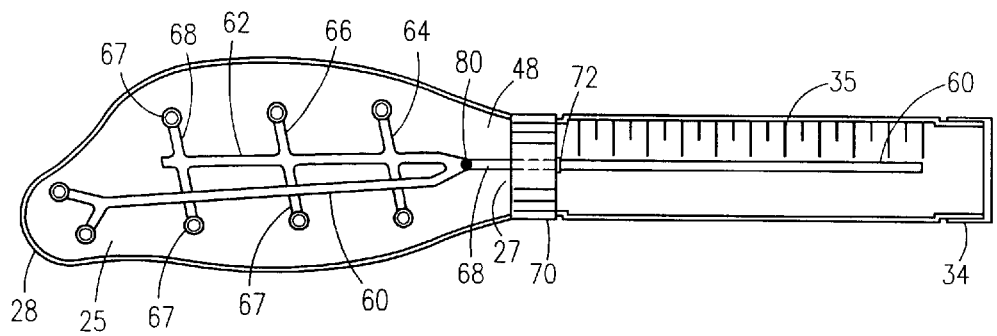
FIG. 2 is a cross-sectional view of the present invention according to the preferred embodiment as taken along lines II—II of FIG. 1.

Referring now to FIG. 1 and FIG. 2, a combination pet brush and grooming solution dispenser 10 is shown, according to the present invention, comprised of a head 20 having a main brush portion affixed to an extended handle 30. The main brush portion 23 is formed of an anterior end 25 opposite a posterior end 27. The anterior end 25 forms a tapered brush portion 28, and the posterior end 27 affixes to the handle 30. The handle 30 has a removable top cap 32 and a removable end cap 34 coupled therewith. An internal conduit 60 rests within the handle 30, and extends throughout the head 20 and tapered brush portion 28.

The brush head portion 23 has a plurality of finger-gripping channels 29 positioned laterally along its outer lateral edges, providing the user with an ergonomic fit for obtaining both a firm and comfortable grasp of the present invention when the handle 30 is removed and the head portion 23 is used only as an otherwise convention grooming brush.

Figure 3:
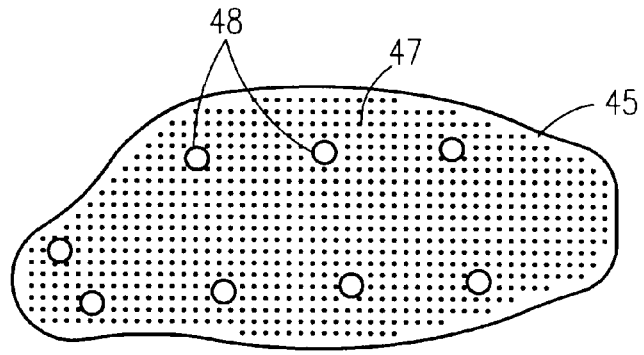
FIG. 3 is a bottom plan view of the present invention according to the preferred embodiment.

As shown in conjunction with FIG. 3, the head 20 further includes a brush head attachment receiving base 43 positioned along the perimeter of a bottom side thereof. The brush head attachment receiving base 43 is designed so as to removably receive a brush head attachment 45. The brush head attachment 45 includes a plurality of bristle members 47 extending outwardly from a bottom side thereof. The brush head attachment 45 further includes a plurality of ring-shaped openings 48 formed on the bottom side thereof for mating with a plurality of applicators 50, as described in greater detail below.

Located just above the anterior end 25 of the head 20 and extending outwardly therefrom is a tapered brush portion 28. The tapered brush portion 28 extends and protrudes to an apex to allow the user to reach areas not easily accessible when applying grooming solution, when brushing a pet's coat, or the like.

As shown in conjunction with FIG. 1 and FIG. 2, located at the posterior end 27 of the head 20 is a reservoir receiving neck 48. The reservoir receiving neck 48 is a threaded, circular opening designed to have a sealable reservoir handle 30 removably coupled thereto. The sealable reservoir handle 30 is of a hollow cylindrical configuration holding a supply of grooming solution sealed therein. The sealable reservoir handle 30 further has a removable top cap 32 and a removable end cap 34 coupled therewith. Although many variations are envisioned, according to the best mode of the preferred embodiment the sealable reservoir handle 30 is anticipated as being formed of a translucent material, thereby allowing the user to quickly and easily determine whether the sealable reservoir handle 30 contains grooming solution.

Measuring indicia 35 are provided along the external circumferential surface of the sealable reservoir handle 30 between the receiving neck 48 and the end cap 34. The measuring indicia 35 allow the user to measure with substantial certainty either the amount of grooming solution added to the sealable reservoir handle 30, the amount of grooming solution contained therein, or the amount dispensed.

The sealable reservoir handle 30 is designed such that after removal of the handle 30 and end cap 34, either end of the sealable reservoir handle 34 can be removably coupled to the reservoir receiving neck 48. It is envisioned that the functionality of such a design allows the sealable reservoir handle 30 to accept grooming solutions in bulk form from bottles in a refillable manner. In addition, because the sealable reservoir handle 30 can be removably coupled to the reservoir receiving neck 48, it is further envisioned that pre-filled sealable reservoir handles 30 could also be utilized. Such a design further allows the user the option of using the head 20 as a traditional brush for brushing a pet's coat without attaching the sealable reservoir handle 30.

Referring in greater detail to FIG. 2, disposed within and extending the length of the brush 10 from the sealable reservoir handle 30 to the tapered brush portion 28 is an internal conduit 60. The internal conduit 60 is of an elongated tubular configuration having a central conduit 62, a first conduit 64, a second conduit 66 and a third conduit 68 wherein the central conduit 62 extends and branches initially from the central conduit 62 into both the first conduit 64 and the second conduit 66. The first conduit 64, the second conduit 66 and the third conduit 68 each include a plurality of dispensing tubes 67 extending therefrom. In conjunction with the other Figures, the dispensing tubes 67 have a plurality of applicators 50, each having tapered applicator tips 52 protruding outwardly therefrom. The applicator tips 52 of the first conduit 64 and the applicator tips 52 of the second conduit 66 located at the anterior end 25 of the main brush portion 23 have an orifice diameter larger in size than the diameter of the applicator tips 52 of the second conduit 66 located and extending along a linearly elongated centerline of the head 20 to the posterior end 27 of the main brush portion 23. Further, the applicator tips closest to the posterior end 27 have smaller orifices than those at the tip in order to aid in the even application of fluid. This ensures the combination pet brush and grooming solution dispenser 10 applies an even portion of grooming solution 33. The applicators 50 are further designed and arranged in such an aligned manner as to mate with the ring-shaped openings 48 located on the bottom side of the brush head attachment 45.

Each applicator 50 penetrates and extend outwardly from the bottom side of the brush head attachment 45 in the direction of the extending bristle members 47 and extending just short the length of the bristle members 47. The applicators 50, being tapered in design, facilitate the application of grooming solution in a focused and more direct area of a pet's coat.

Figure 4:
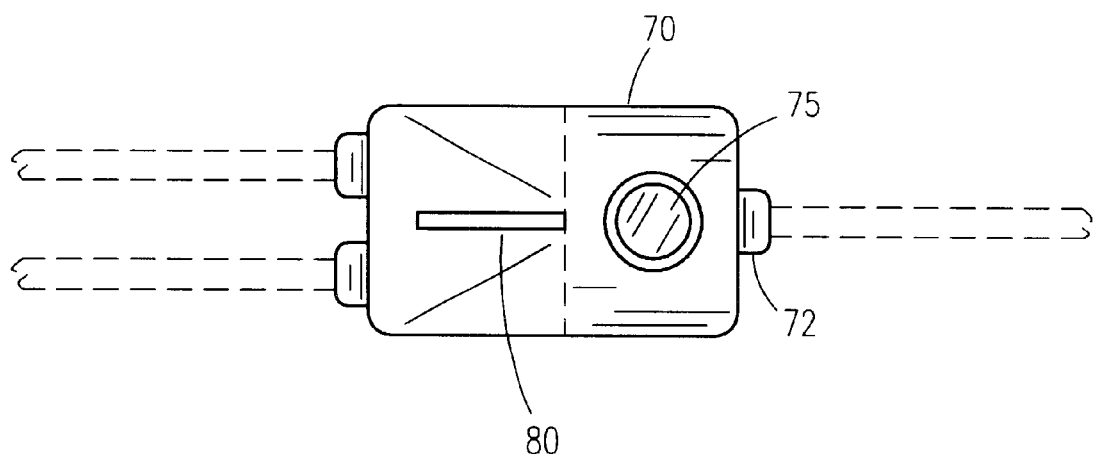
FIG. 4 is a top plan view of the directional switch and button according to the preferred embodiment of the present invention.
Figure 5:
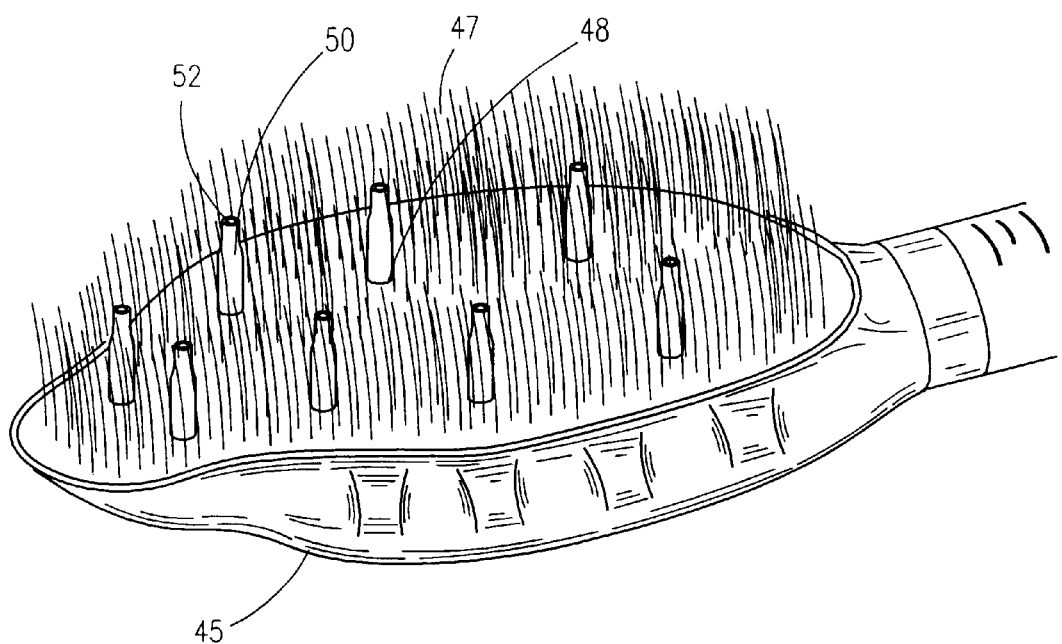
FIG. 5 is a perspective view of the head of the present invention according to the preferred embodiment.

Referring now to FIG. 2, and in greater detail in FIG. 4, a manually-operated pump 70 is disposed within the posterior end 27 of the main brush portion 23 of the head 20. The pump 70 is coupled to the central conduit 62 by an annular rib 72. The pump 70 has an outlet conduit 68 extending outwardly therefrom and branching into conduits 60, 62. To manually force grooming solution through the internal conduit 60, the pump 70 utilizes a depressable button 75 which is actuated by a user's thumb. When activated, the pump 70 draws grooming solution of the sealable reservoir handle 34 into the central conduit 62 and forces the grooming solution through the outlet conduit 68 where it comes into communication with a directional rocking switch 80.

In fluid communication with the internal conduit 60, a directional switch 80 allows for the selective direction of the flow path of the grooming solution. The directional switch 80 controls whether the flow path of the grooming solution 33 is forced through the first conduit 64 or the second conduit 66. The directional switch 80 is configured so as to allow the user the option of applying grooming solution 33 either through the applicators 50 penetrating the bottom side of the main brush portion 23 only, through the tapered brush portion 28 only, or through neither; being designated on the directional switch 80 as the OFF position. The directional switch 80 allows the user to apply grooming solution 33 in hard to reach areas and prevents both over application and waste, which in turn saves the user money.

Referring now to FIGS. 6a and 6b, the applicator tips 52 have an applicator tip cover 55 being modular in design removably coupled thereto for preventing leakage of grooming solution from the applicator tips 52 during nonoperation.

As designed, a device embodying the teachings of the present invention is easily applied. It is envisioned that various improvements and adaptations can be provided within the present teachings, such as various sizes of interchangeable heads could be utilized to correspond with the size of the pet. It is further envisioned that a variety of handles could be utilized including but not limited to a ribbed sealable reservoir handle to increase the user's grasp of the present invention during operation and an opaque handle with a transparent view strip to aid the user in determining whether the sealable reservoir handle contains grooming solution. It is still further envisioned that various types and lengths of bristles could be utilized being adapted to the pet's hair length. It is further envisioned that the present invention may be constructed of any type of lightweight metal or plastic including high impact polystyrenes. Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A combination pet brush and grooming solution dispenser comprising:
    a head having a main brush portion and a tapered brush portion;
    an extended handle affixed to said head; and
    an internal conduit within said handle and extending throughout said head and said tapered brush portion.

2. The combination pet brush and grooming solution dispenser of claim 1 wherein said main brush portion is formed of an anterior end opposite a posterior end, wherein said anterior end forms a tapered brush portion, and said posterior end affixes to said handle.

3. The combination pet brush and grooming solution dispenser of claim 2 wherein said main brush portion is comprised of:
    a plurality of finger-gripping channels, said plurality of finger-gripping channels positioned laterally along outer lateral edges of said main brush portion for providing the user with an ergonomic fit for obtaining both a firm and comfortable grasp of said main brush portion.

4. The combination pet brush and grooming solution dispenser of claim 2 wherein said tapered brush portion being located just above and extending outwardly from said anterior end of said head; said tapered brush portion extending and protruding to an apex.

5. The combination pet brush and grooming solution dispenser of claim 1 wherein said handle is comprised of:
    a removable top cap, said removable top cap coupled to said handle; and
    a removable end cap, said removable end cap coupled to said handle.

6. The combination pet brush and grooming solution dispenser of claim 1 wherein said head further comprises:
    a brush head attachment receiving base, said brush head attachment receiving base is positioned along the perimeter of a bottom side of said head and said brush head attachment receiving base removably receives a brush head attachment.

7. The combination pet brush and grooming solution dispenser of claim 6 wherein said brush head attachment comprises:
    a plurality of bristle members, said plurality of bristle members extending outwardly from a bottom side of said brush head attachment;
    a plurality of ring-shaped openings, said plurality of ring-shaped openings formed on a bottom side of said brush head attachment for mating with a plurality of applicators.

8. The combination pet brush and grooming solution dispenser of claim 6 wherein said head is further comprised of:
    a reservoir receiving neck, said reservoir receiving neck located at said posterior end of said head wherein said reservoir receiving neck is a threaded, circular opening being removably coupled to a sealable reservoir.

9. The combination pet brush and grooming solution dispenser of claim 8, wherein said sealable reservoir handle is of a hollow cylindrical configuration holding a supply of grooming solution sealed inside said sealable reservoir handle; said sealable reservoir having a removable top cap and a removable end cap coupled to said sealable reservoir handle and said sealable reservoir handle being formed of a translucent material for allowing user to quickly and easily determine whether said sealable reservoir handle contains grooming solution.

10. The combination pet brush and grooming solution dispenser of claim 9 wherein said sealable reservoir handle having measuring indicia provided along the external circumferential surface said sealable reservoir handle between said removable top cap and said end cap, wherein said measuring indicia allowing user to measure with substantial certainty either an amount of grooming solution added to said sealable reservoir handle, an amount of grooming solution contained inside said sealable reservoir handle, or an amount dispensed from said sealable reservoir handle.

11. The combination pet brush and grooming solution dispenser of claim 10 wherein either end of said sealable reservoir handle can be removably coupled to said reservoir receiving neck; said sealable reservoir handle receiving grooming solutions in bulk form from bottles in a refillable manner.

12. The combination pet brush and grooming solution dispenser of claim 8 wherein said head is further comprised of:
    a manually-operated pump, said pump disposed within said posterior end of said main brush portion of said head wherein said pump is coupled to said central conduit by an annular rib; said pump having an outlet conduit extending outwardly from said pump and said outlet conduit branching into said first conduit and said second conduit; said pump utilizing a depressable button being actuated by a user's thumb for manually forcing grooming solution through said internal conduit; and said pump drawing grooming solution out of said sealable reservoir handle into said central conduit and forcing grooming solution through said outlet conduit and grooming solution coming into communication with a directional switch.

13. The combination pet brush and grooming solution dispenser of claim 12 wherein said directional switch is in fluid communication with said internal conduit; said directional switch controlling whether the flow path of grooming solution is forced through said first conduit, said second conduit, or both simultaneously, or an off position; said directional switch being configured for allowing user an option of applying grooming solution either through said applicators penetrating a bottom side of said main brush portion only, through said tapered brush portion only, or through neither said main brush portion nor said tapered brush portion being designated on said directional switch as an OFF position; and said directional switch allowing user to apply grooming solution in hard to reach areas and preventing over application and waste.

14. The combination pet brush and grooming solution dispenser of claim 1 wherein said internal conduit being disposed within and extending a length of the present invention from said sealable reservoir handle to said tapered brush portion and being of an elongated tubular configuration is comprised of:

a central conduit, said central conduit extending and branching into a first conduit and a second conduit, wherein said first conduit and said second conduit each having a plurality of dispensing tubes extending from said first conduit and second conduit.

15. The combination pet brush and grooming solution dispenser of claim 14 wherein said dispensing tubes comprised of:

a plurality of applicators, said plurality of applicators penetrating and extending outwardly from a bottom side of said brush head attachment in a direction of said bristle members and extending just short a length of said bristle members; said applicators tapered in design for facilitating application of grooming solution in a focused and more direct area of a pet's coat and said applicators being designed and arranged in such an aligned manner for mating with said ring-shaped openings; and a plurality of applicator tips, said plurality of applicator tips protruding outwardly from each of said plurality of applicators, wherein said applicator tips of said first conduit having an orifice diameter larger in size than a diameter of said applicator tips of said second conduit for ensuring a greater portion of grooming solution is applied by a user in areas more difficult to reach.

* * * * *